United States Patent
Nattha et al.

(10) Patent No.: US 12,309,610 B2
(45) Date of Patent: May 20, 2025

(54) FASTER UE BEAM REFINEMENT IN MULTI-CELL SCENARIO

(71) Applicant: QUALCOMM Incorporated, San Diego, CA (US)

(72) Inventors: Raj Kumar Nattha, San Diego, CA (US); Jun Zhu, San Diego, CA (US); Jyothi Kiran Vattikonda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 17/475,928

(22) Filed: Sep. 15, 2021

(65) Prior Publication Data
US 2023/0077982 A1 Mar. 16, 2023

(51) Int. Cl.
| | |
|---|---|
| H04W 16/28 | (2009.01) |
| H04B 17/318 | (2015.01) |
| H04W 24/08 | (2009.01) |
| H04W 56/00 | (2009.01) |

(52) U.S. Cl.
CPC .......... *H04W 16/28* (2013.01); *H04B 17/318* (2015.01); *H04W 24/08* (2013.01); *H04W 56/001* (2013.01)

(58) Field of Classification Search
CPC ... H04W 16/28; H04W 24/08; H04W 56/001; H04B 17/318; H04B 7/0404; H04B 7/0632; H04B 7/0695; H04B 7/088
See application file for complete search history.

(56) References Cited

U.S. PATENT DOCUMENTS

| | | | |
|---|---|---|---|
| 2020/0413276 A1* | 12/2020 | Zhu | H04W 24/10 |
| 2020/0413309 A1* | 12/2020 | Zhu | H04W 36/00835 |
| 2021/0160028 A1* | 5/2021 | Park | H04W 56/001 |
| 2021/0175953 A1* | 6/2021 | Nilsson | H04B 7/0632 |
| 2021/0258066 A1 | 8/2021 | Yu et al. | |
| 2022/0038163 A1* | 2/2022 | Va | G06N 20/10 |
| 2022/0376768 A1* | 11/2022 | Harrebek | H04L 5/0053 |
| 2023/0006730 A1* | 1/2023 | Miranda | H04B 7/0632 |
| 2024/0031012 A1* | 1/2024 | Yang | H04B 7/1851 |

FOREIGN PATENT DOCUMENTS

WO  WO-2021023912 A1 *  2/2021  ..........  H04B 7/0695

OTHER PUBLICATIONS

International Search Report and Written Opinion—PCT/US2022/040339—ISA/EPO—Jan. 9, 2023.
Partial International Search Report—PCT/US2022/040339—ISA/EPO—Nov. 10, 2022.

* cited by examiner

*Primary Examiner* — Peter P Chau
(74) *Attorney, Agent, or Firm* — Procopio, Cory, Hargreaves & Savitch LLP

(57) ABSTRACT

Method and apparatus for an enhanced beam refinement procedure in a multi-cell scenario. The apparatus receives a beam refinement configuration indicating beam measurement is restricted to a serving cell and excluded for a neighbor cell. The apparatus measures an SSB of the serving cell by sweeping multiple beams restricted based on the beam refinement configuration. Measurement of a concurrent SSB of the neighbor cell is excluded in the sweeping of the multiple beams. The apparatus identifies a refined beam for the serving cell based on the sweeping of the multiple beams.

22 Claims, 12 Drawing Sheets

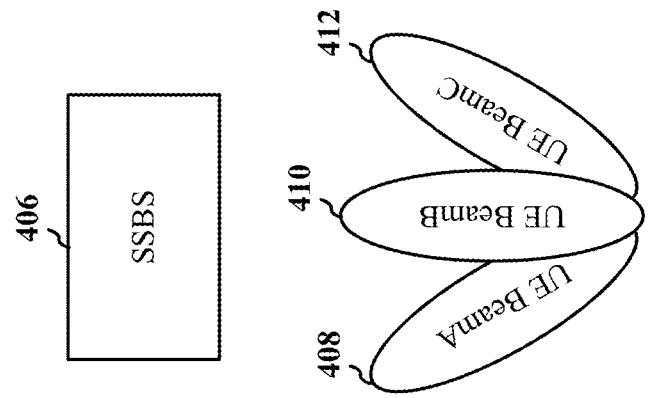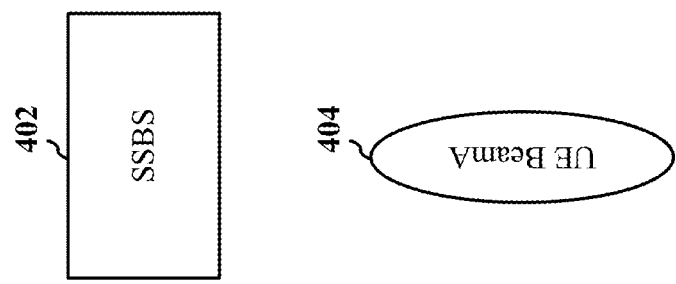
FIG. 4

FASTER UE BEAM REFINEMENT IN MULTI-CELL SCENARIO

TECHNICAL FIELD

The present disclosure relates generally to communication systems, and more particularly, to a configuration for an enhanced beam refinement procedure.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus determines a positioning reference signal (PRS) priority configuration including a priority for a collision between a PRS occasion and a first downlink channel. The apparatus receives an indication that schedules the first downlink channel, the first downlink channel scheduled to potentially collide with the PRS occasion. The apparatus determines that a time interval between the indication that schedules the first downlink channel and the PRS occasion is greater than a first threshold. The time interval is based on a separation between at least a last symbol of the indication and a first symbol of the PRS occasion. The apparatus applies the PRS priority configuration if the first downlink channel collides with the PRS occasion and the time interval is greater than the first threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is an example of multiple levels of beams of a UE.

DETAILED DESCRIPTION

Figure 1:
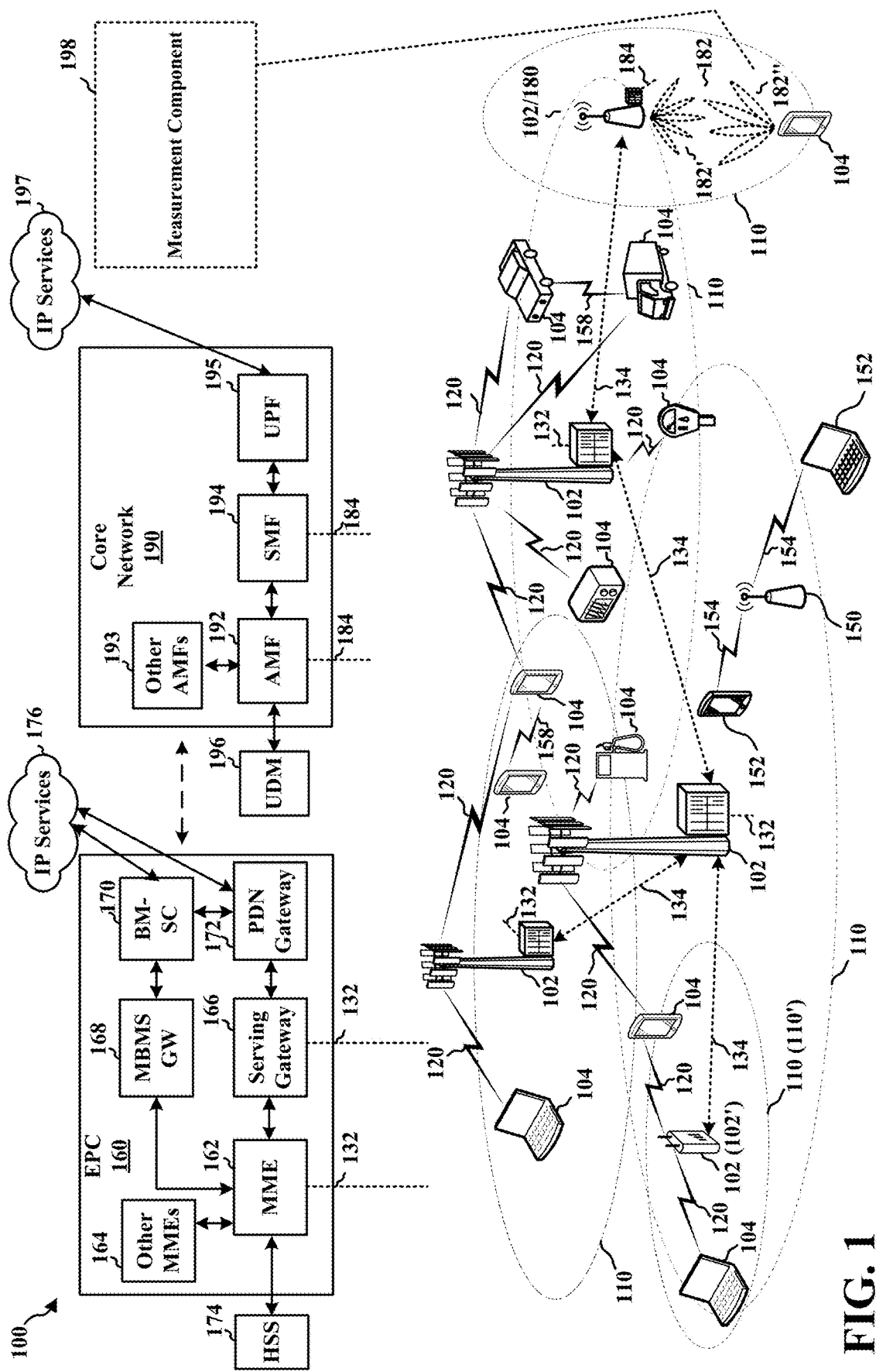
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to restrict measurement to a serving cell during a beam refinement procedure. For example, the UE 104 may comprise a measurement component 198 configured to restrict measurement to a serving cell during a beam refinement procedure. The UE 104 receives a beam refinement configuration indicating beam measurement is restricted to a serving cell and excluded for a neighbor cell. The UE 104 measures an SSB of the serving cell by sweeping multiple beams restricted based on the beam refinement configuration. Measurement of a concurrent SSB of the neighbor cell is excluded in the sweeping of the multiple beams. The UE 104 identifies a refined beam for the serving cell based on the sweeping of the multiple beams.

Although the following description may be focused on 5G NR, the concepts described herein may be applicable to other similar areas, such as LTE, LTE-A, CDMA, GSM, and other wireless technologies.

Figure 2:
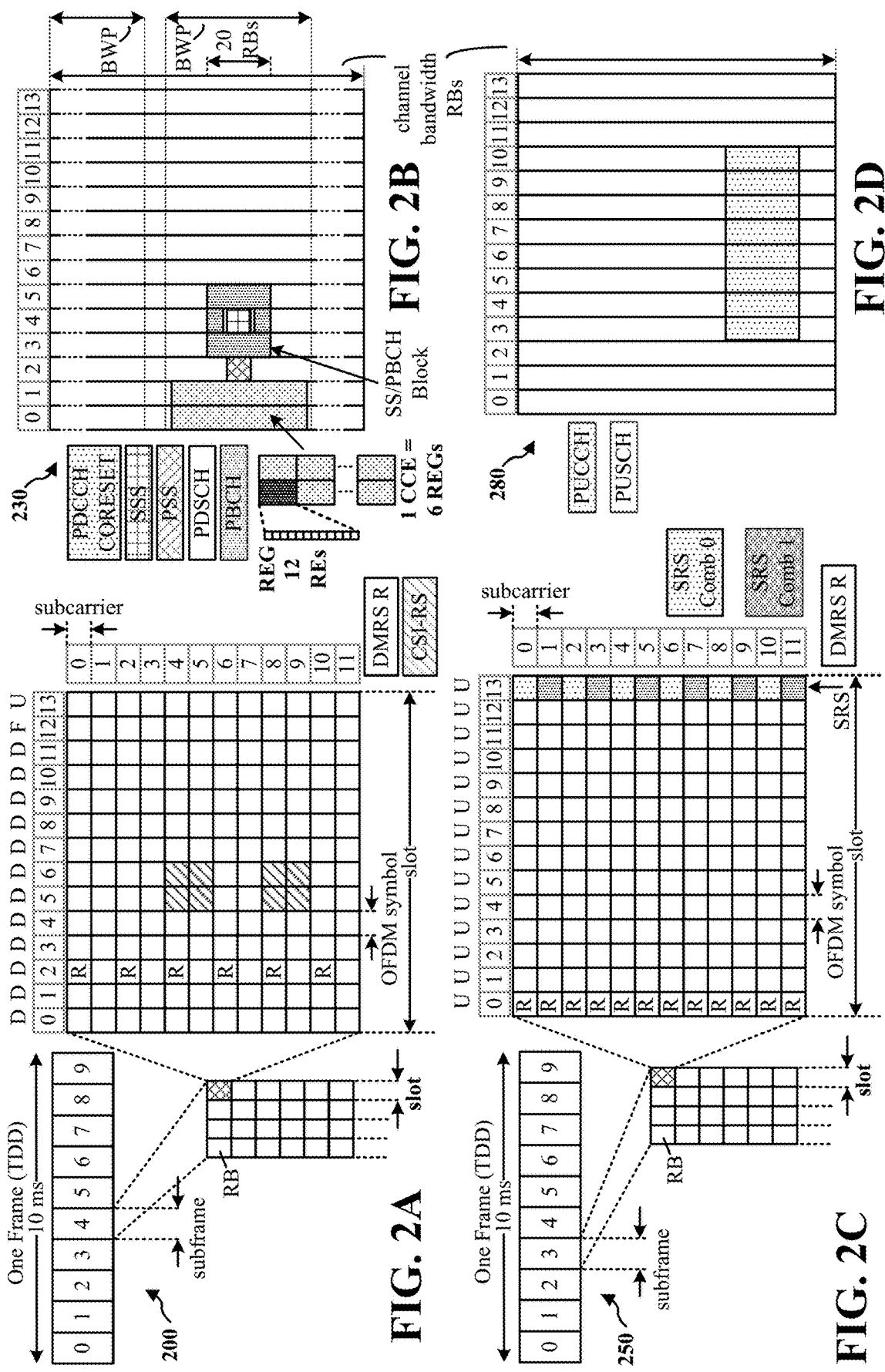
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
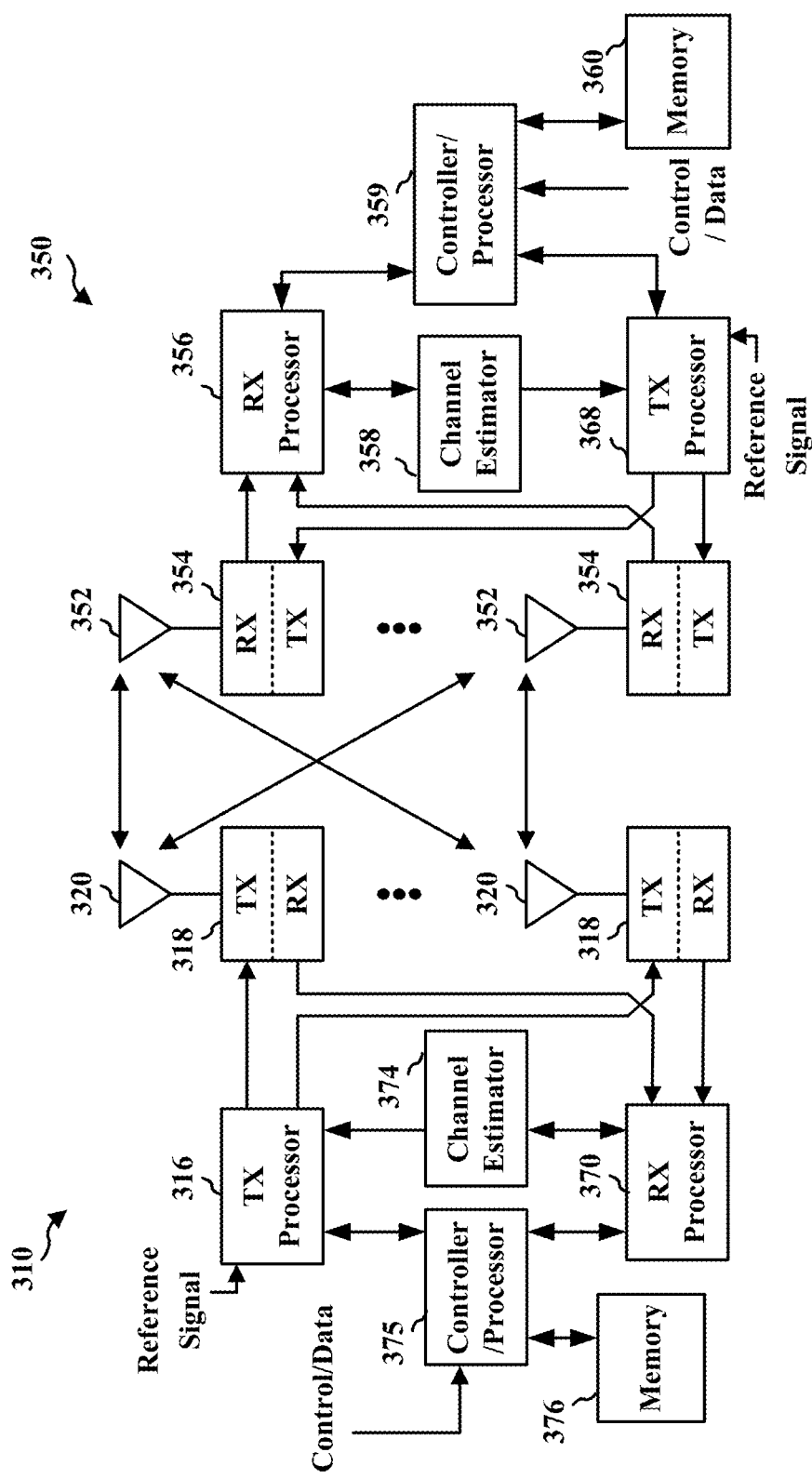
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In wireless communication systems, such as but not limited to millimeter wave systems, the UE may be configured to have multiple levels of beams. In some instances, the multiple level of beams may comprise wide beams and narrow beams. The UE may be configured to perform a beam refinement procedure in an effort to identify the best narrow beam of the UE. The best narrow beam may be utilized to achieve an enhanced throughput in comparison to a wide beam. To perform the beam refinement procedure, the UE may use three symbols of the SSB block (e.g., PBCH0, SSS, PBCH1) for measuring different UE beams, which may be known as 3× measurements. For example, with reference to diagram 400 of FIG. 4, the UE may utilize a single beam (e.g., UE beam A 404) to measure the SSB symbols 402 in instances where the UE is only measuring SSS. In instances where the UE is utilizing the 3× measurements, the UE may utilize multiple beams (e.g., UE beamA 408, UE beamB 410, UE beamC 412) to measure the three SSB symbols 406.

Figure 5:
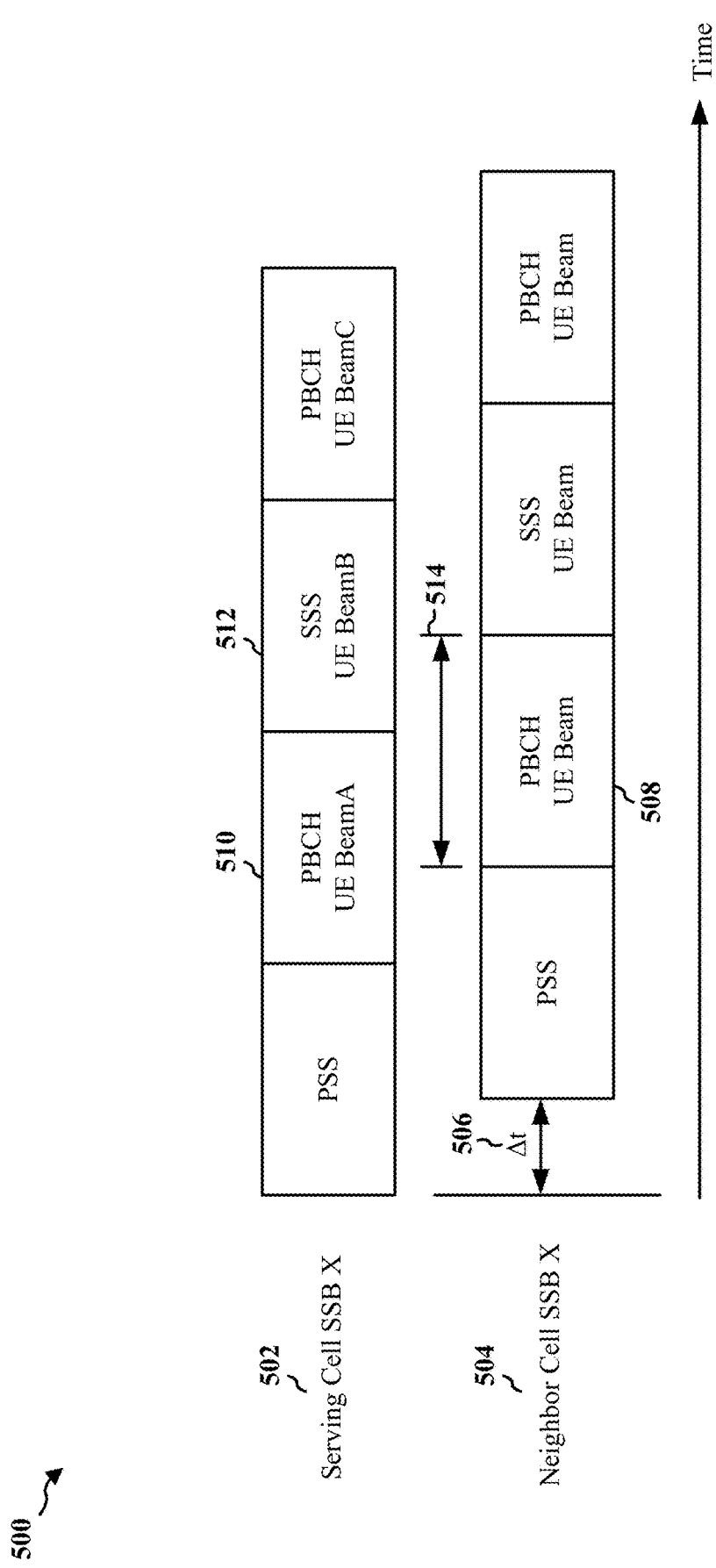
FIG. 5 is an example of measurements of a serving cell synchronization signal block (SSB) and a neighbor cell SSB.
Figure 6:
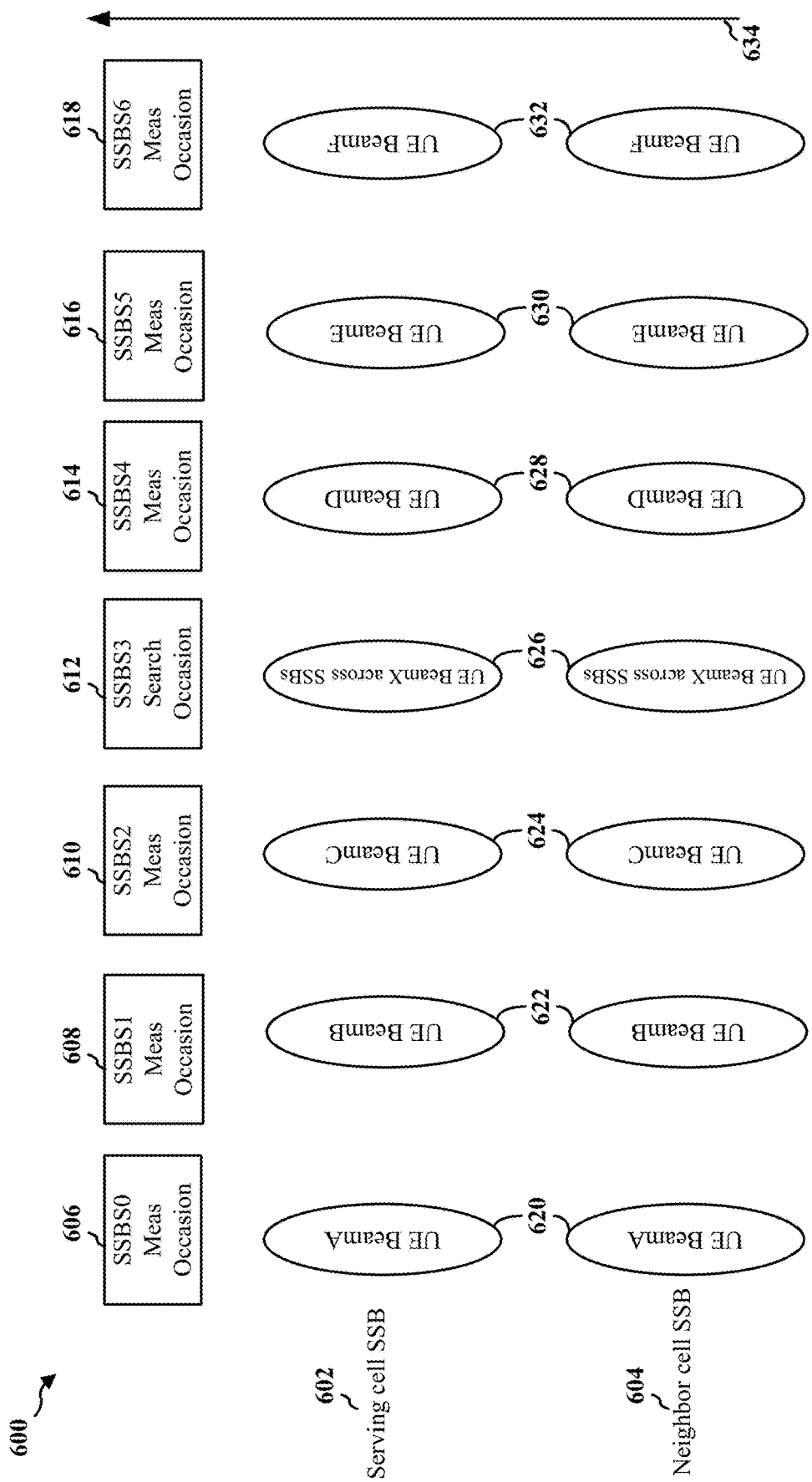
FIG. 6 is an example of a beam refinement procedure.

In instances where the neighbor cell SSBs are transmitted by the network, the UE may not be able to take advantage of monitoring all three symbols of the SSB block. For example, with reference to diagram 500 of FIG. 5, a time delta Δt 506 may be present between the serving cell SSB X 502 and the neighbor cell SSB X 504, such that a measurement window 514 for the neighbor cell may comprise samples from multiple UE beams. For example, the measurement window 514 of PBCH 508 overlaps with PBCH UE BeamA 510 and SSS UE BeamB 512 and may comprise samples from PBCH UE BeamA 510 and SSS UE BeamB 512. In such instances, the UE may fall back to monitoring only one symbol (e.g., SSS) when SSB is detected on both serving and neighbor cell. As a result, the beam refinement procedure may experience delays due in part to more SSBS occasions being required to cover all wide beams. For example, with reference to diagram 600 of FIG. 6, the UE may comprise 6 wide beams (e.g., BeamA 620, BeamB 622, BeamC 624, BeamD 628, BeamE 630, BeamF 632), and the UE would measure 6 SSBS measurement occasions (e.g., 606, 608, 610, 614, 616, 618) before identifying a best wide beam and start a refinement procedure. In the diagram 600 of FIG. 6, the UE is measuring each measurement occasion using a single wide beam to measure the serving cell SSB 602 and the neighbor cell SSB 604. The UE, at 634, may complete measuring the wide beams after measurement occasion 618, and may determine a highest rated wide beam after the measurement occasion 618. The higher the number of UE wide beams, the more the delay to start monitoring narrow beams. The search occasion 612 may provide the UE an occasion to measure the same UE beam (e.g., 626) across the SSBs, which may introduce an additional delay.

Aspects presented herein provide a configuration for an enhanced beam refinement procedure. The enhanced beam refinement procedure may allow a UE to restrict measurement to a serving cell during the beam refinement procedure. Restricting measurement to the serving cell may allow the UE to perform a sweeping of multiple beams of the UE to measure the SSB of the serving cell. At least one advantage of the disclosure is that the enhanced beam refinement procedure may increase the rate at which the UE may commence monitoring narrow beams and identify a refined beam.

Figure 7:
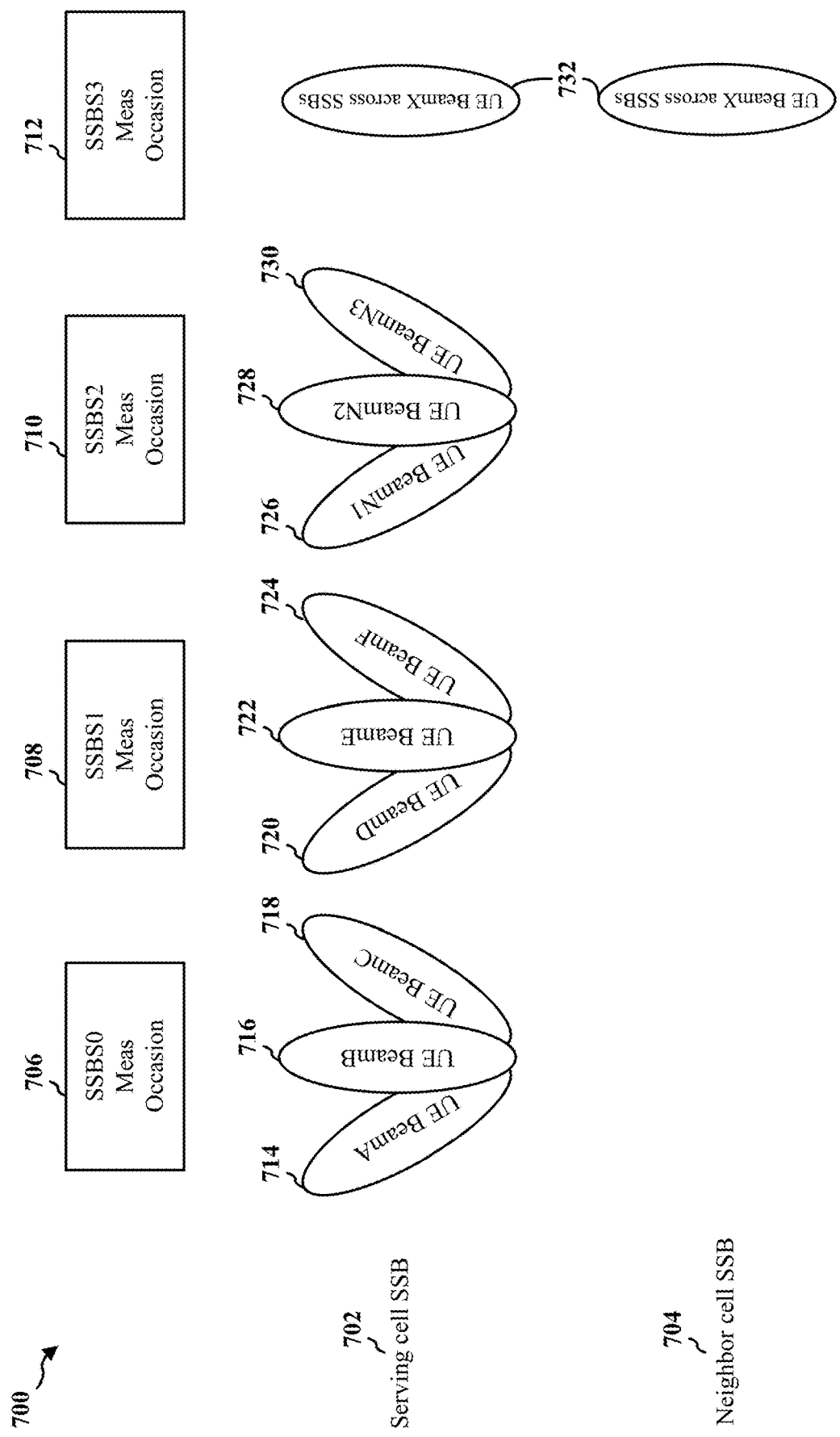
FIG. 7 is an example of an enhanced beam refinement procedure.

FIG. 7 is a diagram 700 of an enhanced beam refinement procedure. The diagram 700 provides an example of the UE restricting measurement to the serving cell SSB 702 during an initial refinement period, such as after entering in connected mode. The UE may restrict measurement to the serving cell SSB 702 and exclude measurement of the neighbor cell SSB 704. Restricting the measurement to the serving cell SSB 702 and excluding measurement of the neighbor cell SSB 704 allows the UE to perform a multiple beam sweep of wide beams of the UE. For example, the UE may utilize three beams to sweep its wide beams and move towards a narrow beam at an increased rate, which may improve the throughput. With reference to the diagram 700 of FIG. 7, the UE, at the first measurement occasion 706, may utilize BeamA 714, BeamB 716, and BeamC 718 to measure the serving cell SSB 702. At the next measurement occasion 708, the UE may utilize BeamD 720, BeamE 722, BeamF 724 to measure the serving cell SSB 702. From here, the UE may determine the highest rated wide beam (e.g., BeamA-BeamF) and start sweeping the serving cell SSB 702 using narrow beams associated with the highest rated wide beam. For example, the UE, at the next measurement occasion 710, may utilize narrow beams BeamN1 726, BeamN2 728, BeamN3 730 to measure the serving cell SSB 702. The UE may determine the highest rated narrow beam as a refined beam for communicating with the base station. Communication with the base station using the refined beam may allow for an increased throughput. After the determination of the refined beam, the beam refinement procedure may be complete, such that the UE may measure the neighbor cell SSB 704. For example, at the subsequent measurement occasion 712, the UE may measure the serving cell SSB 702 and the neighbor cell SSB using a common beam (e.g., 732). Neighbor cells may be monitored during search occasions upon completion of the beam refinement procedure. The restricting of measurements to the serving cell of the beam refinement procedure may occur in instances where the UE is in very good RF conditions, for example, in instances where the RSRP is greater than a first threshold (e.g., −80 dBm) and/or where the SNR is greater than a second threshold (e.g., 10 dB), in an effort to minimize the impact on mobility. The diagram 700 of FIG. 7 provides an example with 6 wide beams, but the disclosure is not intended to be limited to the examples provided herein. In some aspects, the UE may have more or less than 6 wide beams. In addition, values provided for the first and second thresholds are merely examples, and are non-limiting examples. The values of the first and second thresholds may be less than or greater than the examples provided herein.

Figure 8:
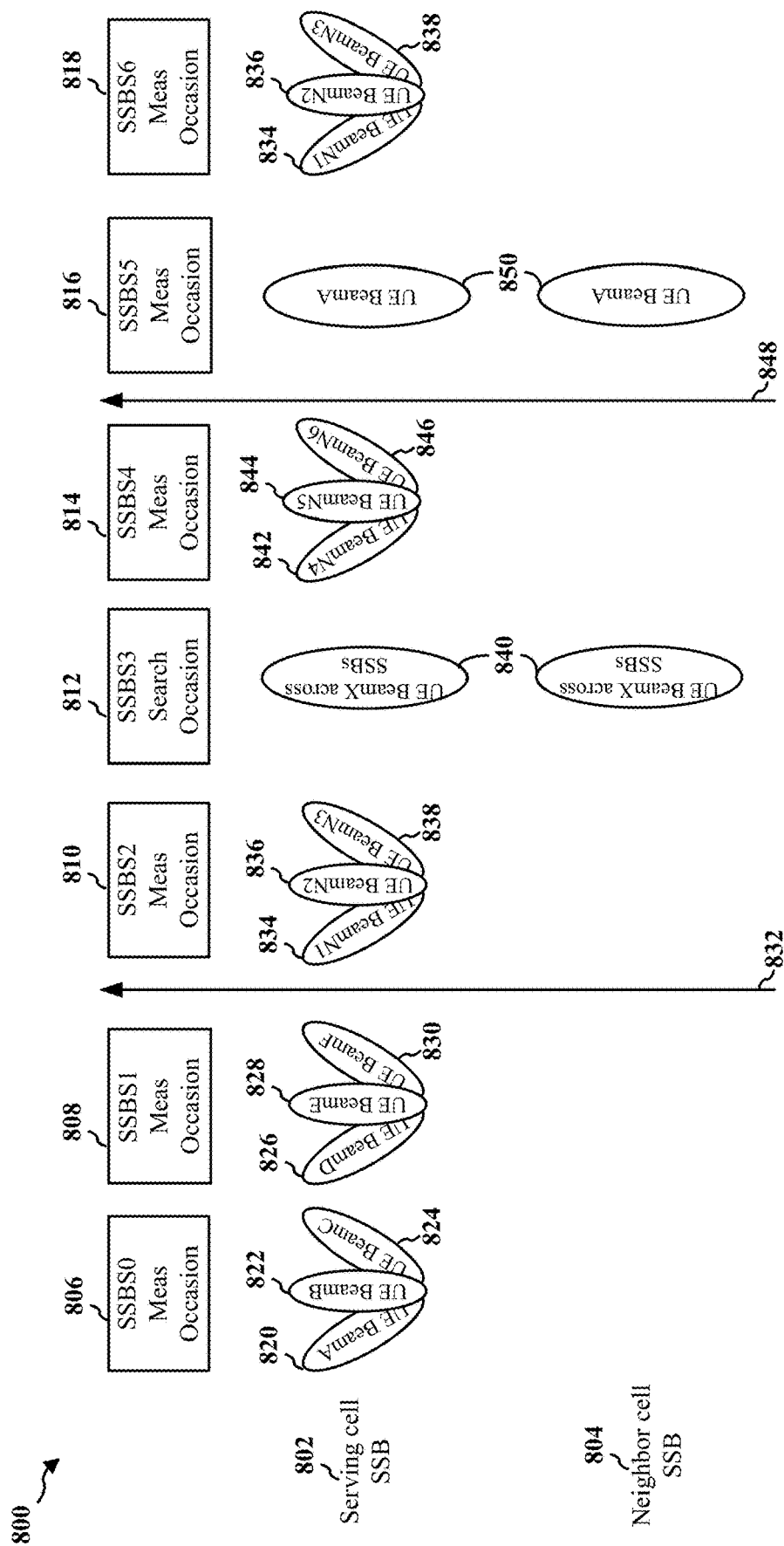
FIG. 8 is an example of an enhanced beam refinement procedure.

FIG. 8 is a diagram 800 of the enhanced beam refinement procedure. The UE may utilize the three wide beams (e.g., 820, 822, 824) to perform sweeping measurements of the serving cell SSB 802 at measurement occasion 806. The UE restricts measurements to the serving cell SSB 802, and excludes measurements of the neighbor cell SSB 804. At the next measurement occasion 808, the UE may use another set of three wide beams (e.g., 826, 828, 830) to perform sweeping measurements of the serving cell SSB 802. The wide beam sweeping may be completed at 832, and the UE may determine the highest rated wide beam from the set of wide beams (e.g., 820, 822, 824, 826, 828, 830). The highest rated wide beam may be based on at least one of channel quality or signal strength. The UE, having identified the highest rated wide beam, may commence sweeping the serving cell SSB 802 using the associated narrow beams or child narrow beams of the highest rated wide beam. At measurement occasion 810, the UE may utilize three narrow beams (e.g., 834, 836, 838) of the highest rated wide beam to perform sweeping measurements of the serving cell SSB 802. A search occasion 812 may occur, and the UE may measure the serving cell SSB 802 and the neighbor cell SSB using a common beam 840. The UE may resume the measurement of the serving cell SSB 802 using another set of three narrow beams (e.g., 842, 844, 846) to perform sweeping measurements of the serving cell SSB 802. The narrow beam sweeping may be completed at measurement occasion 814, such that the UE, at 848, may determine the highest rated narrow beam from the set of narrow beams (e.g., 834, 836, 838, 842, 844, 846). The highest rated narrow beam may be considered as the refined beam for communication with the base station. Upon completion of the beam refinement procedure (e.g., 848), the UE may measure the serving cell SSB 802 and the neighbor cell SSB 804 using a common beam (e.g., 850). In some aspects, the UE may monitor the serving cell SSB 802 at measurement occasion 818 using a set of three narrow beams (e.g., 834, 836, 838). The beam refinement procedure enhances the rate at which the refined beam may be determined.

Figure 9:
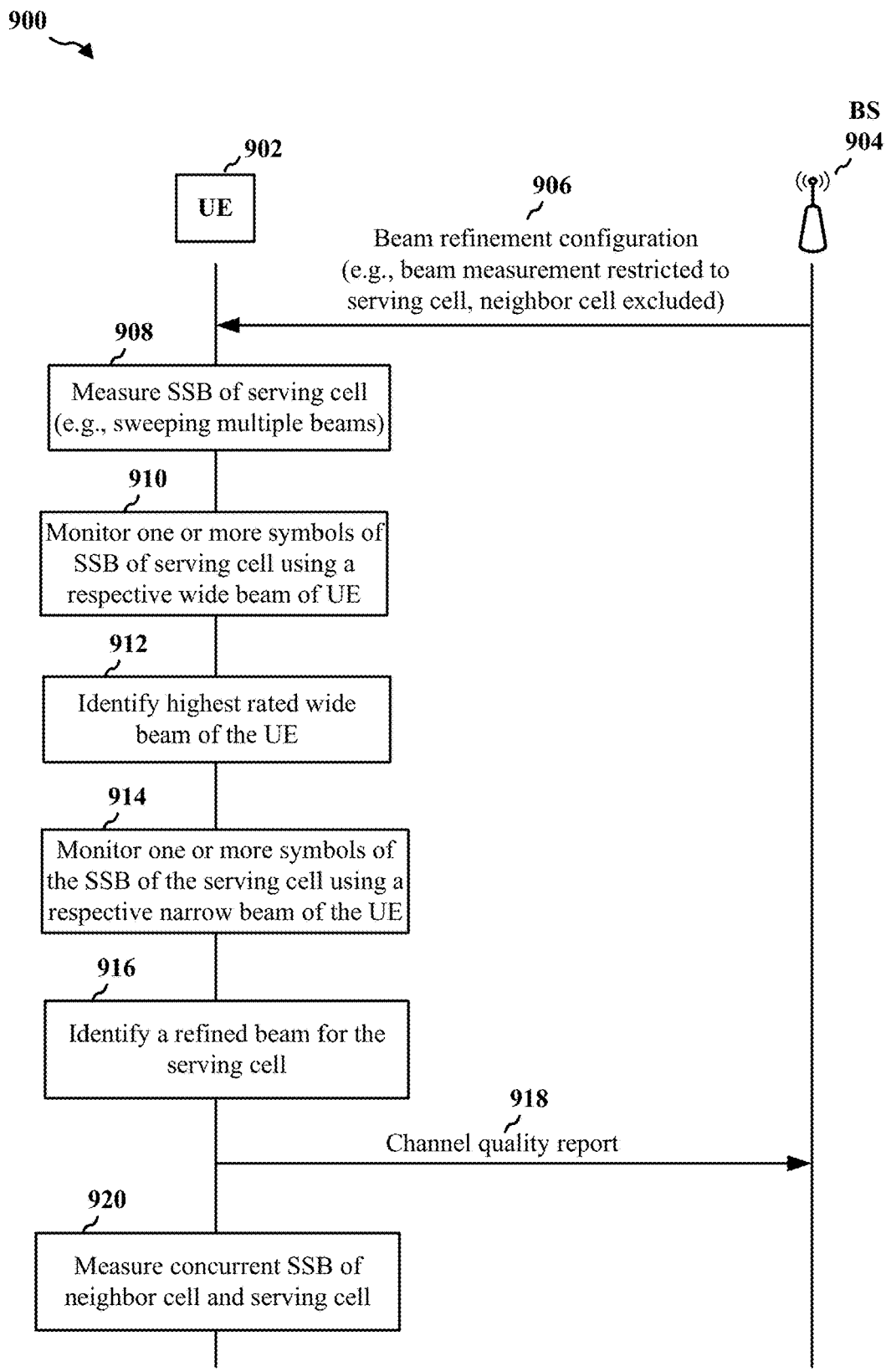
FIG. 9 is a call flow diagram of signaling between a UE and a base station.

FIG. 9 is a call flow diagram 900 of signaling between a UE 902 and a base station 904. The base station 904 may be configured to provide at least one cell. The UE 902 may be configured to communicate with the base station 904. For example, in the context of FIG. 1, the base station 904 may correspond to base station 102/180 and, accordingly, the cell may include a geographic coverage area 110 in which communication coverage is provided and/or small cell 102' having a coverage area 110'. Further, a UE 902 may correspond to at least UE 104. In another example, in the context of FIG. 3, the base station 904 may correspond to base station 310 and the UE 902 may correspond to UE 350.

At 906, the base station 904 may transmit a beam refinement configuration to the UE 902. The UE 902 may receive the beam refinement configuration from the base station 904. The beam refinement configuration may indicate that beam measurement, of a beam refinement procedure, may be restricted to a serving cell and excluded for a neighbor cell (not shown).

At 908, the UE 902 may measure an SSB of the serving cell (e.g., 904). The UE may measure the SSB of the serving cell by sweeping multiple beams. The sweeping of the multiple beams may be restricted based on the beam refinement configuration. Measurement of a concurrent SSB of the neighbor cell may be excluded in the sweeping of the multiple beams. In some aspects, a beam refinement procedure may occur if signal strength received by the UE is greater than a first threshold and if an SNR is greater than a second threshold. For example, at 910, to sweep the multiple beams to measure the SSB of the serving cell, the UE may monitor one or more symbols of the SSB of the serving cell using a respective wide beam of the UE. In some aspects, the one or more symbols of the SSB may be monitored to measure each wide beam of the UE. In some aspects, the one or more symbols of the SSB monitored comprise at least one of a secondary synchronization signal (SSS) or a physical broadcast channel (PBCH). In some aspects, at 912, the UE may identify a highest rated wide beam of the UE. The UE may identify the highest rated wide beam of the UE based on the monitoring the one or more symbols of the SSB of the serving cell. In some aspects, the highest rated wide beam may be based on at least one of channel quality or signal strength. The channel quality or signal strength may be determined based on the monitoring of the one or more symbols of the SSB of the serving cell. In some aspects, at 914, the UE may monitor one or more symbols of the SSB of the serving cell using a respective narrow beam associated with the highest rated wide beam. In some aspects, each wide beam of the UE may comprise one or more narrow beams. In some aspects, the one or more symbols of the SSB may be monitored to measure each narrow beam of the UE.

At 916, the UE may identify a refined beam for the serving cell. The UE may identify the refined beam for the serving cell based on the sweeping of the multiple beams. In some aspects, the refined beam may be based on at least one of channel quality or signal strength. The channel quality or signal strength may be determined based on the sweeping of the multiple beams. The refined beam may comprise the highest rated narrow beam from a set of narrow beams associated with the highest rated wide beam.

At 918, the UE may report a channel quality to a base station. The UE may report the channel quality to the base station such that a level of the channel quality indicates that the UE may be communicating with the serving cell using the refined beam. In some aspects, communication with the serving cell using the refined beam may provide a higher throughput in comparison to communication with the serving cell using a wide beam.

At 920, the UE may measure the concurrent SSB of the neighbor cell and the serving cell using a single common beam. In some aspects, the beam refinement configuration may include instructions to measure the concurrent SSB of the neighbor cell after completion of a beam refinement procedure.

Figure 10:
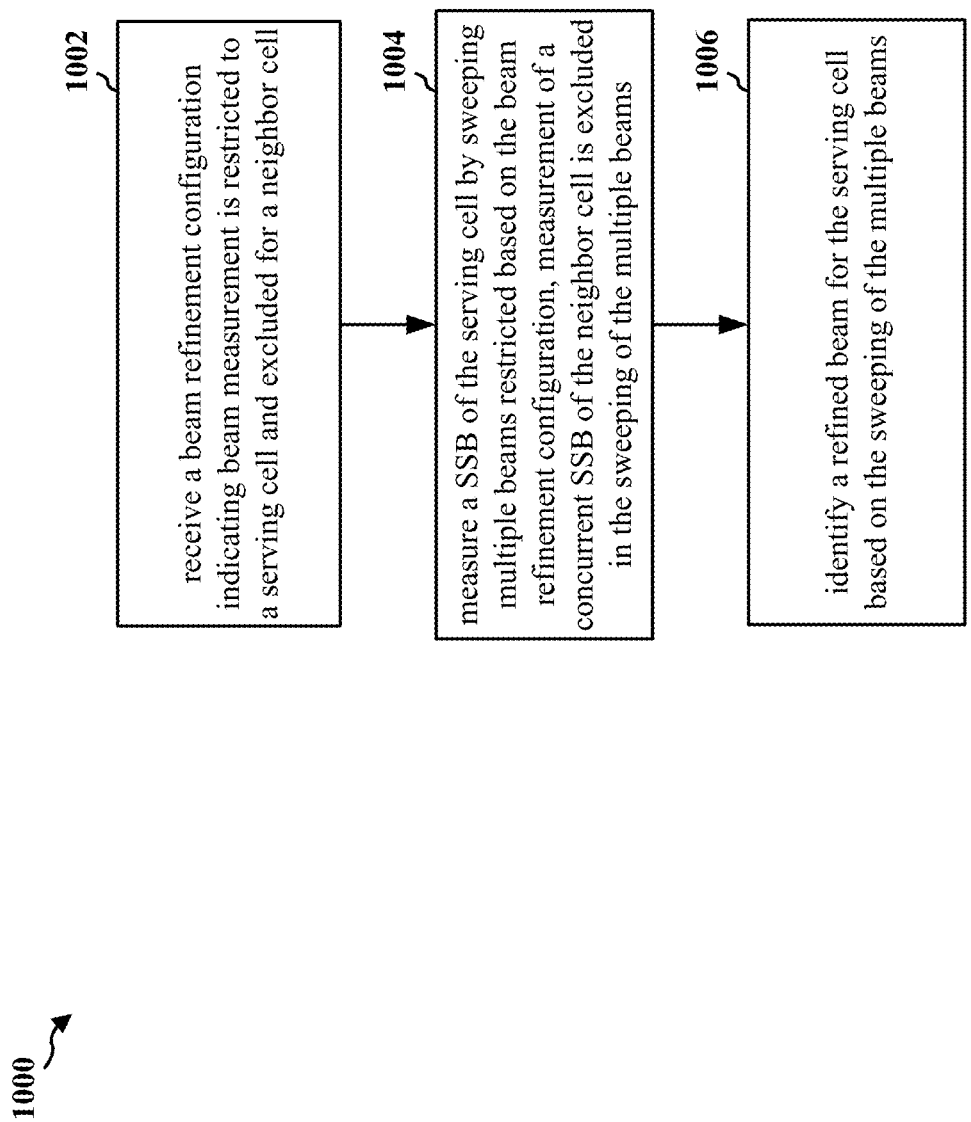
FIG. 10 is a flowchart of a method of wireless communication.

FIG. 10 is a flowchart 1000 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to restrict measurement to a serving cell during a beam refinement procedure.

At 1002, the UE may receive a beam refinement configuration. For example, 1002 may be performed by configuration component 1240 of apparatus 1202. The UE may receive the beam refinement configuration from a base station. The beam refinement configuration may indicate that beam measurement may be restricted to a serving cell and excluded for a neighbor cell.

At 1004, the UE may measure an SSB of the serving cell. For example, 1004 may be performed by measurement component 1242 of apparatus 1202. The UE may measure the SSB of the serving cell by sweeping multiple beams. The sweeping of the multiple beams may be restricted based on the beam refinement configuration. Measurement of a concurrent SSB of the neighbor cell may be excluded in the sweeping of the multiple beams. In some aspects, a beam refinement procedure may occur if signal strength received by the UE is greater than a first threshold and if a signal to noise ratio (SNR) is greater than a second threshold.

At 1006, the UE may identify a refined beam for the serving cell. For example, 1006 may be performed by identification component 1244 of apparatus 1202. The UE may identify the refined beam for the serving cell based on the sweeping of the multiple beams. In some aspects, the refined beam may be based on at least one of channel quality or signal strength. The channel quality or signal strength may be determined based on the sweeping of the multiple beams.

Figure 11:
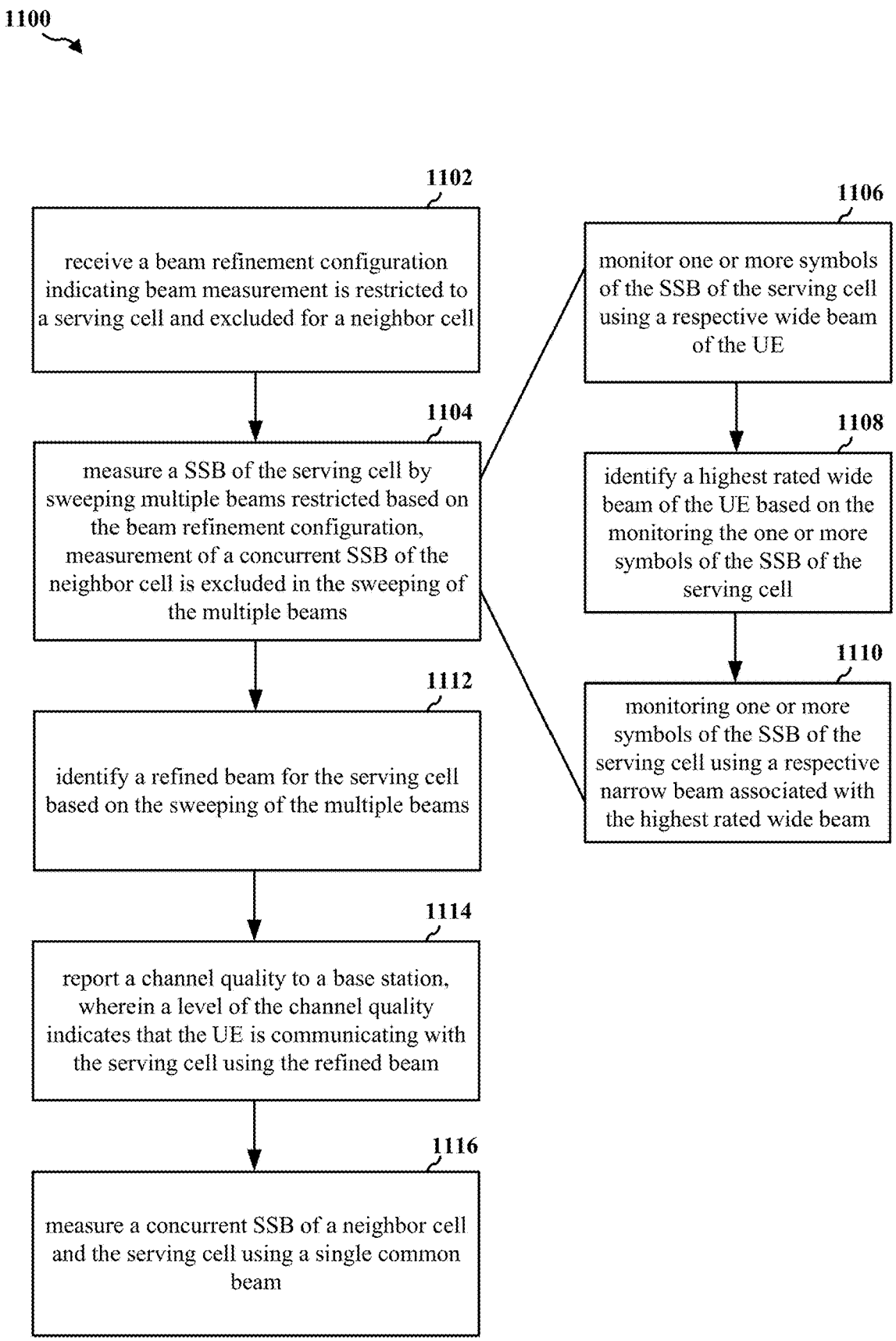
FIG. 11 is a flowchart of a method of wireless communication.

FIG. 11 is a flowchart 1100 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to restrict measurement to a serving cell during a beam refinement procedure.

At 1102, the UE may receive a beam refinement configuration. For example, 1102 may be performed by configuration component 1240 of apparatus 1202. The UE may receive the beam refinement configuration from a base station. The beam refinement configuration may indicate that beam measurement may be restricted to a serving cell and excluded for a neighbor cell.

At 1104, the UE may measure an SSB of the serving cell. For example, 1104 may be performed by measurement component 1242 of apparatus 1202. The UE may measure the SSB of the serving cell by sweeping multiple beams. The sweeping of the multiple beams may be restricted based on the beam refinement configuration. Measurement of a concurrent SSB of the neighbor cell may be excluded in the sweeping of the multiple beams. In some aspects, a beam refinement procedure may occur if signal strength received by the UE is greater than a first threshold and if an SNR is greater than a second threshold. For example, at 1106, to sweep the multiple beams to measure the SSB of the serving cell, the UE may monitor one or more symbols of the SSB of the serving cell using a respective wide beam of the UE. For example, 1106 may be performed by measurement component 1242 of apparatus 1202. In some aspects, the one or more symbols of the SSB may be monitored to measure each wide beam of the UE. In some aspects, the one or more symbols of the SSB monitored comprise at least one of a secondary synchronization signal (SSS) or a physical broadcast channel (PBCH). In another example, at 1108, the UE may identify a highest rated wide beam of the UE. For example, 1108 may be performed by identification component 1244 of apparatus 1202. The UE may identify the highest rated wide beam of the UE based on the monitoring the one or more symbols of the SSB of the serving cell. In some aspects, the highest rated wide beam may be based on at least one of channel quality or signal strength. The channel quality or signal strength may be determined based on the monitoring of the one or more symbols of the SSB of the serving cell. In another example, at 1110, the UE may monitor one or more symbols of the SSB of the serving cell using a respective narrow beam associated with the highest rated wide beam. For example, 1110 may be performed by measurement component 1242 of apparatus 1202. In some aspects, each wide beam of the UE may comprise one or more narrow beams. In some aspects, the one or more symbols of the SSB may be monitored to measure each narrow beam of the UE.

At 1112, the UE may identify a refined beam for the serving cell. For example, 1112 may be performed by identification component 1244 of apparatus 1202. The UE may identify the refined beam for the serving cell based on the sweeping of the multiple beams. In some aspects, the refined beam may be based on at least one of channel quality or signal strength. The channel quality or signal strength may be determined based on the sweeping of the multiple beams.

At 1114, the UE may report a channel quality to a base station. For example, 1114 may be performed by report component 1246 of apparatus 1202. The UE may report the channel quality to the base station such that a level of the channel quality indicates that the UE may be communicating with the serving cell using the refined beam. In some aspects, communication with the serving cell using the refined beam may provide a higher throughput in comparison to communication with the serving cell using a wide beam.

At 1116, the UE may measure the concurrent SSB of the neighbor cell and the serving cell using a single common beam. For example, 1116 may be performed by measurement component 1242 of apparatus 1202. In some aspects, the beam refinement configuration may include instructions to measure the concurrent SSB of the neighbor cell after completion of a beam refinement procedure.

Figure 12:
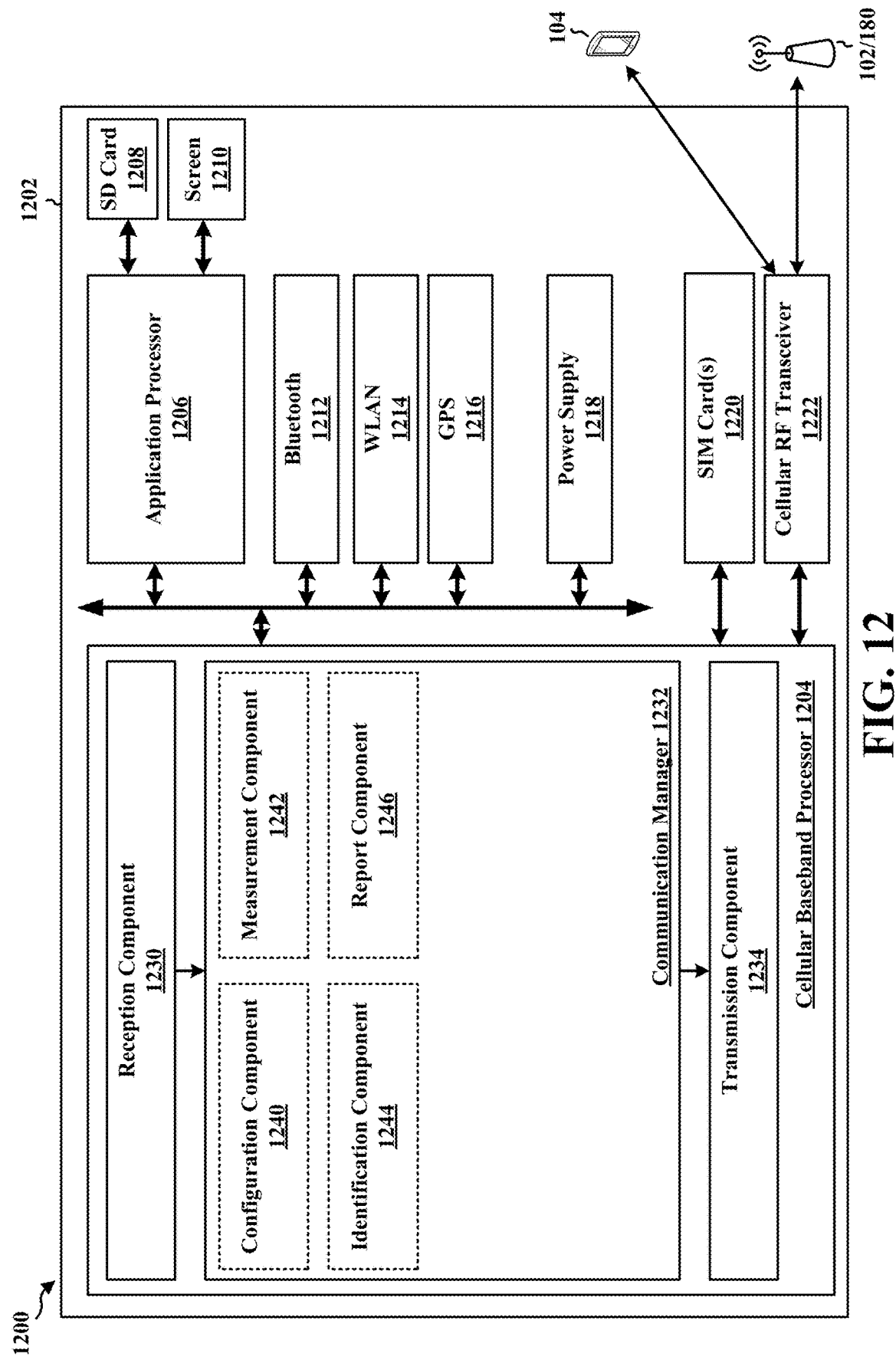
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a configuration component 1240 that is configured to receive a beam refinement configuration, e.g., as described in connection with 1002 of FIG. 10 or 1102 of FIG. 11. The communication manager 1232 further includes a measurement component 1242 that is configured to measure an SSB of the serving cell, e.g., as described in connection with 1004 of FIG. 10 or 1104 of FIG. 11. The measurement component 1242 may be further configured to monitor one or more symbols of the SSB of the serving cell using a respective wide beam of the UE, e.g., as described in connection with 1106 of FIG. 11. The measurement component 1242 may be further configured to monitor one or more symbols of the SSB of the serving cell using a respective narrow beam associated with the highest rated wide beam, e.g., as described in connection with 1110 of FIG. 11. The measurement component 1242 may be further configured to measure the concurrent SSB of the neighbor cell and the serving cell using a single common beam, e.g., as described in connection with 1116 of FIG. 11. The communication manager 1232 further includes an identification component 1244 that is configured to identify a refined beam for the serving cell, e.g., as described in connection with 1006 of FIG. 10 or 1112 of FIG. 11. The identification component 1244 may be further configured to identify a highest rated wide beam of the UE, e.g., as described in connection with 1108 of FIG. 11. The communication manager 1232 further includes a report component 1246 that is configured to report a channel quality to a base station, e.g., as described in connection with 1114 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving a beam refinement configuration indicating beam measurement is restricted to a serving cell and excluded for a neighbor cell. The apparatus includes means for measuring an SSB of the serving cell by sweeping multiple beams restricted based on the beam refinement configuration. Measurement of a concurrent SSB of the neighbor cell is excluded in the sweeping of the multiple beams. The apparatus includes means for identifying a refined beam for the serving cell based on the sweeping of the multiple beams. The apparatus further includes means for monitoring one or more symbols of the SSB of the serving cell using a respective wide beam of the UE. The apparatus further includes means for identifying a highest rated wide beam of the UE based on the monitoring the one or more symbols of the SSB of the serving cell. The apparatus further includes means for monitoring one or more symbols of the SSB of the serving cell using a respective narrow beam associated with the highest rated wide beam. The apparatus further includes means for measuring the concurrent SSB of the neighbor cell and the serving cell using a single common beam. The apparatus further includes means for reporting a channel quality to a base station, wherein a level of the channel quality indicates that the UE is communicating with the serving cell using the refined beam. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a beam refinement configuration indicating beam measurement is restricted to a serving cell and excluded for a neighbor cell; measure an SSB of the serving cell by sweeping multiple beams restricted based on the beam refinement configuration, wherein measurement of a concurrent SSB of the neighbor cell is excluded in the sweeping of the multiple beams; and identify a refined beam for the serving cell based on the sweeping of the multiple beams.

Aspect 2 is the apparatus of aspect 1, further including a transceiver coupled to the at least one processor.

Aspect 3 is the apparatus of any of aspects 1 and 2, further includes that to sweep the multiple beams to measure the SSB of the serving cell the at least one processor is further configured to monitor one or more symbols of the SSB of the serving cell using a respective wide beam of the UE; identify a highest rated wide beam of the UE based on the monitoring the one or more symbols of the SSB of the serving cell; and monitor one or more symbols of the SSB of the serving cell using a respective narrow beam associated with the highest rated wide beam.

Aspect 4 is the apparatus of any of aspects 1-3, further includes that each wide beam of the UE comprises one or more narrow beams.

Aspect 5 is the apparatus of any of aspects 1-4, further includes that the highest rated wide beam is based on at least one of channel quality or signal strength, wherein the refined beam is based on at least one of channel quality or signal strength.

Aspect 6 is the apparatus of any of aspects 1-5, further includes that the one or more symbols of the SSB are monitored to measure each wide beam or each narrow beam of the UE.

Aspect 7 is the apparatus of any of aspects 1-6, further includes that the one or more symbols of the SSB monitored comprise at least one of a SSS or a PBCH.

Aspect 8 is the apparatus of any of aspects 1-7, further includes that the beam refinement configuration includes instructions to measure a concurrent SSB of a neighbor cell after completion of a beam refinement procedure.

Aspect 9 is the apparatus of any of aspects 1-8, further includes that the at least one processor is further configured to measure the concurrent SSB of the neighbor cell and the serving cell using a single common beam.

Aspect 10 is the apparatus of any of aspects 1-9, further includes that a beam refinement procedure occurs if signal strength received by the UE is greater than a first threshold and if a SNR is greater than a second threshold.

Aspect 11 is the apparatus of any of aspects 1-10, further includes that the at least one processor is further configured to report a channel quality to a base station, wherein a level of the channel quality indicates that the UE is communicating with the serving cell using the refined beam.

Aspect 12 is the apparatus of any of aspects 1-11, further includes that communication with the serving cell using the refined beam provides a higher throughput in comparison to communication with the serving cell using a wide beam.

Aspect 13 is a method of wireless communication for implementing any of aspects 1-12.

Aspect 14 is an apparatus for wireless communication including means for implementing any of aspects 1-12.

Aspect 15 is a computer-readable medium storing computer executable code, where the code when executed by a processor causes the processor to implement any of aspects 1-12.

What is claimed is:

1. An apparatus for wireless communication at a user equipment (UE), comprising:
   memory; and
   at least one processor coupled to the memory and configured to:
   receive a beam refinement configuration indicating beam measurement is restricted to a serving cell and excluded for a neighbor cell;
   measure a synchronization signal block (SSB) of the serving cell by sweeping multiple beams restricted based on the beam refinement configuration, wherein measurement of a concurrent SSB of the neighbor cell is excluded in the sweeping of the multiple beams; and
   identify a refined beam for the serving cell based on the sweeping of the multiple beams; and
   wherein to sweep the multiple beams to measure the SSB of the serving cell, the at least one processor is further configured to:
   monitor one or more symbols of the SSB of the serving cell using a respective wide beam from a plurality of wide beams of the UE;
   identify a highest rated wide beam of the UE based on the monitoring the one or more symbols of the SSB of the serving cell using the respective wide beam from the plurality of wide beams of the UE; and
   monitor one or more different symbols of the SSB of the serving cell using a respective narrow beam associated with the highest rated wide beam.

2. The apparatus of claim 1, further comprising a transceiver coupled to the at least one processor.

3. The apparatus of claim 1, wherein each of the plurality of wide beams of the UE comprises one or more narrow beams.

4. The apparatus of claim 1, wherein the highest rated wide beam is based on at least one of channel quality or signal strength, wherein the refined beam is based on at least one of channel quality or signal strength.

5. The apparatus of claim 1, wherein the one or more symbols of the SSB are monitored to measure each wide beam of the plurality of wide beams or each narrow beam of a plurality of narrow beams associated with a corresponding wide beam of the plurality of wide beams of the UE.

6. The apparatus of claim 1, wherein the one or more symbols of the SSB monitored comprise at least one of a secondary synchronization signal (SSS) or a physical broadcast channel (PBCH).

7. The apparatus of claim 1, wherein the beam refinement configuration includes instructions to measure a concurrent SSB of a neighbor cell after completion of a beam refinement procedure.

8. The apparatus of claim 7, wherein the at least one processor is further configured to:
   measure the concurrent SSB of the neighbor cell and the serving cell using a single common beam.

9. The apparatus of claim 1, wherein a beam refinement procedure occurs if signal strength received by the UE is greater than a first threshold and if a signal to noise ratio (SNR) is greater than a second threshold.

10. The apparatus of claim 1, wherein the at least one processor is further configured to:
    report a channel quality to a base station, wherein a level of the channel quality indicates that the UE is communicating with the serving cell using the refined beam.

11. The apparatus of claim 10, wherein communication with the serving cell using the refined beam provides a higher throughput in comparison to communication with the serving cell using a wide beam.

12. A method of wireless communication at a user equipment (UE), comprising:
    receiving a beam refinement configuration indicating beam measurement is restricted to a serving cell and excluded for a neighbor cell;
    measuring a synchronization signal block (SSB) of the serving cell by sweeping multiple beams restricted based on the beam refinement configuration, wherein measurement of a concurrent SSB of the neighbor cell is excluded in the sweeping of the multiple beams; and
    identifying a refined beam for the serving cell based on the sweeping of the multiple beams; and
    wherein the sweeping of the multiple beams to measure the SSB of the serving cell comprises:
    monitoring one or more symbols of the SSB of the serving cell using a respective wide beam from a plurality of wide beams of the UE;
    identifying a highest rated wide beam of the UE based on the monitoring the one or more symbols of the SSB of the serving cell using the respective wide beam from the plurality of wide beams of the UE; and
    monitoring one or more different symbols of the SSB of the serving cell using a respective narrow beam associated with the highest rated wide beam.

13. The method of claim 12, wherein each of the plurality of wide beams of the UE comprises one or more narrow beams.

14. The method of claim 12, wherein the highest rated wide beam is based on at least one of channel quality or signal strength, wherein the refined beam is based on at least one of channel quality or signal strength.

15. The method of claim 12, wherein the one or more symbols of the SSB are monitored to measure each wide beam of the plurality of wide beams or each narrow beam of a plurality of narrow beams associated with a corresponding wide beam of the plurality of wide beams of the UE.

16. The method of claim 12, wherein the one or more symbols of the SSB monitored comprise at least one of a secondary synchronization signal (SSS) or a physical broadcast channel (PBCH).

17. The method of claim 12, wherein the beam refinement configuration includes instructions to measure a concurrent SSB of a neighbor cell after completion of a beam refinement procedure.

18. The method of claim 17, further comprising:
measuring the concurrent SSB of the neighbor cell and the serving cell using a single common beam.

19. The method of claim 12, wherein a beam refinement procedure occurs if signal strength received by the UE is greater than a first threshold and if a signal to noise ratio (SNR) is greater than a second threshold.

20. The method of claim 12, further comprising:
reporting a channel quality to a base station, wherein a level of the channel quality indicates that the UE is communicating with the serving cell using the refined beam.

21. The method of claim 20, wherein communication with the serving cell using the refined beam provides a higher throughput in comparison to communication with the serving cell using a wide beam.

22. A non-transitory computer-readable medium storing computer executable code at a user equipment (UE), the code when executed by a processor causes the processor to:
receive a beam refinement configuration indicating beam measurement is restricted to a serving cell and excluded for a neighbor cell;
measure a synchronization signal block (SSB) of the serving cell by sweeping multiple beams restricted based on the beam refinement configuration, wherein measurement of a concurrent SSB of the neighbor cell is excluded in the sweeping of the multiple beams; and
identify a refined beam for the serving cell based on the sweeping of the multiple beams; and
wherein to sweep the multiple beams to measure the SSB of the serving cell, the code when executed by the processor causes the processor to:
monitor one or more symbols of the SSB of the serving cell using a respective wide beam from a plurality of wide beams of the UE;
identify a highest rated wide beam of the UE based on the monitoring the one or more symbols of the SSB of the serving cell using the respective wide beam from the plurality of wide beams of the UE; and
monitor one or more different symbols of the SSB of the serving cell using a respective narrow beam associated with the highest rated wide beam.

* * * * *